United States Patent Office 3,819,716
Patented June 25, 1974

3,819,716
SULFONYL OR SULFINYL SUBSTITUTED
INDENYL ALCOHOLS
Tsung-ying Shen, Westfield, and Howard Jones, Holmdel,
N.J., assignors to Merck & Co., Inc., Rahway, N.J.
No Drawing. Filed Dec. 6, 1972, Ser. No. 312,456
Int. Cl. C07c 147/06
U.S. Cl. 260—607 A          6 Claims

ABSTRACT OF THE DISCLOSURE

New substituted indenyl alcohols and derivatives thereof which have anti-inflammatory, anti-pyretic and analgesic activity. Also included are methods of preparing said indenyl compounds, pharmaceutical compositions having said indenyl compounds as an active ingredient and methods of treating inflammation.

SUMMARY OF THE INVENTION

This invention relates to new substituted 1-(Ar)-alkyl-idene (or heteroalkylidene) indenyl alcohols, ethers and reverse esters and to processes for producing the same. This invention also relates to pharmaceutical compositions containing said indenyl alcohol compounds as an active ingredient and to methods of treating pain, fever or inflammation by administering these particular compositions to patients.

DESCRIPTION AND PREFERRED EMODIMENTS

The invention is more particularly directly to new substituted indenyl alcohol compounds having the following general formula:

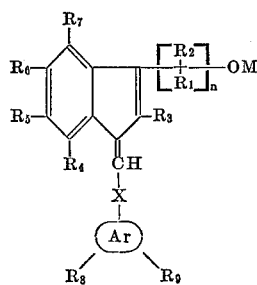

I wherein:

$R_1$ and $R_2$ each may be hydrogen, halogen, alkyl, alkenyl, aryl, haloalkyl, alkylthio, arylthio, aralkylthio, amino, alkylamino, dialkylamino, acylamino, N-heterocyclic, hydroxy, alkoxy, alkenyloxy, alkynyloxy, aralkoxy, haloalkoxy, carboxy, alkoxycarbonyl, (Ar)-alkoxy-carbonyl or $R_1$ and $R_2$ together may be alkylene or keto;
$R_3$ may be hydrogen, alkyl, haloalkyl, alkenyl, alkynyl or trihalomethyl;
$R_4$, $R_5$, $R_6$, $R_7$, $R_8$ and $R_9$ each may be hydrogen, alkyl, acyloxy, aryloxy, alkoxy, nitro, amino, acylamino, alkylamino, dialkylamino, alkenyl, alkynyl, alkenyloxy, dialkylaminoalkyl, sulfamyl, alkylthio, alkylsulfinyl, alkylsulfonyl, hydroxy, hydroxyalkyl, acyl, halo, cyano, carboxyl, carboalkoxy, carbamido, haloalkyl, cycloalkyl, trifluoromethyl or cycloalkyloxy;
X may be alkylene, alkenylene, alkynylene, O, S, carbonyl, sulfinyl or NR wherein R is hydrogen or alkyl;
$n$ is 0, or 1 or 2;
(Ar) may be aryl or heteroaryl;

M may be hydrogen, alkyl, cycloalkyl, alkenyl, alkynyl, alkanoyl, haloalkanoyl, alkenoyl, alkynoyl, cycloalkanoyl or aryl containing less than three fused rings or Y wherein Y is:

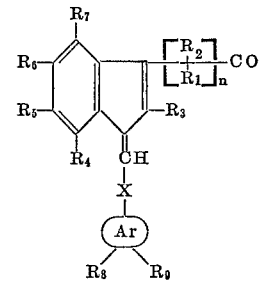

The aryl or heteroaryl substituent, (Ar), may include an aryl ring system such as benzene, naphthalene, biphenyl or a heteroaryl ring system such as a pyrrole, furan, thiophene, pyridine, imidazole, pyrazine, thiazole, pyrimidine, benzothiazole, pyrazole, oxazole, pyrane, pyridazine, indole, thionaphthene, benzofuran, benzimidazole, azaindole, benzoxyrane, quinoline, isoquinoline, quinoxaline, naphthyridine or benzoxazole and may be substituted with any of the aforementioned $R_8$ and $R_9$ substituents.

In the preferred compounds of this invention $R_1$ and $R_2$ are hydrogen, $C_{1-5}$ loweralkyl, $C_{2-5}$ loweralkenyl, phenyl or benzyl; $R_3$ is hydrogen, $C_{1-5}$ loweralkyl or $C_{1-5}$ chloro, bromo or fluoro loweralkyl; $R_4$, $R_5$, $R_6$ and $R_7$ may be hydrogen, halo (chloro, bromo, fluoro), $C_{1-5}$ loweralkyl, halo $C_{1-5}$ loweralkyl, $C_{1-5}$ loweralkoxy, cyano, nitro, amino, $C_{1-5}$ loweralkylamino, $C_{1-5}$ diloweralkylamino, $C_{1-5}$ loweralkanoylamino, $C_{1-5}$ loweralkanoyloxy, hydroxy, $C_{1-5}$ loweralkanoyl, $C_{2-5}$ loweralkanoyl, $C_{2-5}$ loweralkenyloxy or trifluoromethyl; $R_8$ and $R_9$ are each hydrogen, chloro, bromo, fluoro, $C_{1-5}$ loweralkylthio, $C_{1-5}$ loweralkyl, trifluoromethyl, $C_{1-5}$ loweralkylsulfonyl, $C_{1-5}$ loweralkylsulfinyl, $C_{1-5}$ diloweralkylsulfamyl, nitro or $C_{1-5}$ loweralkoxy; X is $C_{1-4}$ alkylene, $C_{2-4}$ alkenylene, $C_{2-4}$ alkynylene or —O—; $n$ is 1 or 2; (Ar) is the residue of benzene, naphthalene, pyridine, thiophene, pyrazine, pyrrole, furan, pyrimidine, benzothiazole, thiazole, pyrazole, oxazole, pyrane, pyridazine, indole, thionaphthene, benzofuran, benzimidazole, azaindole, quinoline, isoquinoline, quinoxaline, naphthyridine or benzoxazole; and M is hydrogen, $C_{1-5}$ loweralkyl, phenyl or benzyl.

In the most preferred aspect of this invention $R_1$ and $R_2$ is hydrogen, $C_{1-5}$ loweralkyl, phenyl or benzyl; $R_3$ is hydrogen or $C_{1-5}$ loweralkyl; $R_4$, $R_5$, $R_6$ and $R_7$ are each hydrogen, chloro, bromo, fluoro, $C_{1-5}$ loweralkyl, $C_{1-5}$ loweralkoxy, nitro, amino, $C_{1-5}$ loweralkylamino, halo $C_{1-5}$ loweralkyl, $C_{1-5}$ diloweralkylamino, $C_{2-5}$ loweralkanoyloxy, hydroxy $C_{2-5}$ loweralkanoyloxy or trifluoromethyl, at most only 2 of $R_4$, $R_5$, $R_6$ or $R_7$ being other than hydrogen at any one time; $R_8$ and $R_9$ are each hydrogen, $C_{1-5}$ loweralkyl, $C_{1-5}$ loweralkoxy, $C_{1-5}$ loweralkylsulfinyl, $C_{1-5}$ loweralkylsulfonyl, chloro, bromo, fluoro, $C_{1-5}$ loweralkylthio, trifluoromethyl, $C_{1-5}$ loweralkylsulfamyl, $C_{1-5}$ diloweralkylsulfamyl or nitro; X is $C_{1-4}$ alkylene, $C_{2-4}$ alkenylene, $C_{2-4}$ alkynylene or —O—; $n$ is 1 or 2; (Ar) is phenyl; and M is hydrogen; $C_{1-5}$ loweralkyl, benzyl or phenyl.

This invention also relates to a method of treating pain, fever or inflammation in patients using a compound of Formula I, particularly and especially the preferred compounds as the active constituent.

The compounds of the instant invention can be used to treat inflammation by reducing inflammation and relieving pain in such diseases as rheumatoid arthritis, osteoarthritis, gout, infectious arthritis and rheumatic fever. The compounds of Formula I can also be used as an anti-pyretic and would be administered and used in the same manner and in the same dosage ranges as if they were being used to treat inflammation as discussed further on.

The treatment of inflammation in accordance with the method of the present invention is accomplished by topically, orally, rectally or parenterally administering to patients a composition of a compound of Formula I, particularly the especially preferred compounds in a non-toxic pharmaceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, Cab-O-Sil and acacia. Exemplary of liquid carriers are peanut oil, olive oil, seasame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup, an aqueous solution or a liquid suspension. Suppositories may be prepared in a conventional manner by mixing the compounds of this invention with a suitable non-irritating excipient which is solid at room temperature, but liquid at the rectal temperature. Such materials are cocoa butter and polyethylene glycol. Gels and lotions for topical application may be prepared in conventional manners.

The compounds of Formula I and of the compositions of this invention are to be administered in an amount sufficient to treat inflammation, that is to reduce inflammation. Advantageously, the compositions will contain the active ingredient; namely, the compounds of Formula I in an amount of from about 0.1 mg. to 50 mg. per kg. body weight per day (5 mg. to 3.5 g. per patient per day), preferably from about 1 mg. to 15 mg./kg. body weight per day (50 mg. to 1 g. per patient per day).

The method of treatment of this invention comprises administering to a patient (animal or human), a compound of Formula I, particularly an especially preferred compound admixed with a non-toxic pharmaceutical carrier such as exemplified above. The compounds of Formula I and particularly the especially preferred compounds will be administered in an amount of from 0.1 mg. to 50 mg./kg. body weight per day, preferably from about 1 mg. to about 15 mg. per kilogram body weight per day. The most rapid and effective anti-inflammatory effect is obtained from oral administration of a daily dsoage of from about 1 to 15 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of adminstration, route of administration, rate of excretion, drug combination, reaction sensitivities and severity of the particular disease.

The compounds of this invention may be prepared from their corresponding acids or esters. For example, a 1-unsubstituted 3-indenyl acetic acid or ester may be first converted to its corresponding alcohol by methods well known in the art for reduction of an acid group or ester to an alcohol group (such as with complex hydrides, for example, lithium aluminum hydride or calcium borohydride, in such solvents as tetrahydrofuran ether and the like), followed by condensation and dehydration with the appropriate aldehyde in the 1-position of the indene. This later reaction may readily be carried out by using a strong base such as alkali hydroxide or alkoxide and the like, as the catalyst, the reaction can be carried out in a solvent, if desired and conveniently at temperatures of from 60° C. to the reflux tempertaure of the system. Alternatively, the 1-substituted 3-indenyl acetic acid or ester may be first prepared followed by reduction of the acid side chain to the alcohol. The ethers and reverse esters of these alcohols may be prepared by well known etherification or esterification reactions. In those cases wherein X is oxygen, it is preferred to convert the 1-unsubstituted indene ester to the correspoding 1-hydroxymethyl compound by reactions with ethyl formate and an alkali hydride, followed by reaction with an aryl halide to form the 1-aryloxymethylidene compound, and finally reduction of this compound to the corresponding 3-ethanol compound.

The starting material, i.e., 1-unsubstituted-3-indenyl acetic acids or esters are known compounds as indicated by such as U.S. patents as U.S. 3,654,349, 3,312,730 and others. The 1-substituted derivatives thereof may be readily prepared by condensation and dehydration of the 1-unsubstituted-3-indenyl acetic acids or esters.

The following examples are given by way of illustration.

EXAMPLE 1

Ethyl-2-methyl-5-fluoro-3-indenylacetate

A mixture of 0.1 mole of 2-methyl-5-fluoro-3-indenyl acetic acid, 0.2 gm. of p-toluene sulfonic acid, in 100 ml. of absolute ethanol and 75 ml. of dry benzene is refluxed on a steam bath while distilling the solvent. After 17 hours, the residual solvent is removed under reduced pressure. The residue is slurried in aqueous soduim bicarbonate and then with water until neutral. The resulting ethyl ester is then recrystallized from ethyl acetate.

Similarly, when

α-(2-methyl-5-methoxy-3-indenyl)propionic acid,
2-methyl-7-fluoro-3-indenyl acetic acid,
2-methyl-6-fluoro-3-indenyl acetic acid,
2-methyl-5-trifluoromethyl-3-indenyl acetic acid,
2-methyl-5-methoxy-3-indenyl acetic acid,
2-methyl-5-nitro-3-indenyl acetic acid,
2-methyl-5,6-difluoro-3-indenyl acetic acid,
2-methyl-5-chloro-3-indenyl acetic acid,
2-methyl-5-dimthylamino-3-indenyl acetic acid,
2-methyl-5-allyloxy-3-indenyl acetic acid,
2-methyl-5-cyano-3-indenyl acetic acid, or
2-methyl-5-methoxy 6-fluoro-3-indenyl acetic acid, is used in an equivalent amount in place of 2-methyl-5-fluoro-3-indenyl acetic acid, there is obtained the corresponding ethyl acetate.

EXAMPLE 2

(A) 5-Fluoro-2-methyl-3-indenyl-β-ethanol

To a suspension of lithium aluminum hydride (1.0 g., 0.264 mole) in ether (50 ml.) is added methyl-5-fluoro-2-methyl-3-indenylacetate (9.8 g., 0.0446 mole) in ether (75 ml.) over 30 minutes. The mixture is heated at reflux for 3 hours, cooled to 0–5° and methanol (50 ml.) added. Water (50 ml.) is added slowly. Magnesium sulfate (10 g.) is added and the mixture is filtered through diatomaceous earth. The filtrate is dried (MgSO$_4$) and concentrated to an oil. The oil is taken up in benzene and chromatographed on silica gel. After elution of some starting material and a mixed fraction, 5-fluoro-2-methyl-3-indenyl-β-ethanol is obtained.

Similarly, when any of the other ethylacetate compounds obtained from Example 1 are used in an equivalent amount in place of ethyl 2-methyl-5-fluoro-3-indenyl acetate, in the above example, the corresponding -β-ethanol compounds are obtained.

(B) *cis-* and *trans-*5-Fluoro-2-methyl-1-(4'-methyl-sulfinylcinnamylidenyl)-3-indenyl-β-ethanol To a solution of 5-fluoro-2-methyl-3-indenyl-β-ethanol from Example 1(A) (3.84 g., 0.020 mole) in methanol (60 ml.) is added sodium methoxide (2.16 g., 0.04 mole) and after solution p-methylsulfinylcinnamaldehyde (0.02 mole). The mixture is heated at reflux for 5 hours, cooled, poured into ether-water, extracted with ether, dried (MgSO$_4$), and concentrated to an oil *in vacuo*. The oil is taken up in methylene chloride and chromatographed on silica gel and eluted with ethyl acetate. The fractions of eluate are concentrated to yield *cis-* and *trans* - 5 - fluoro-2-methyl-1-(4'-methylsulfinylcinnamylidenyl)-3-indenyl-β-ethanol.

Similarly, when an equivalent amount of any of the other ethanol compounds obtained from Example 2(A) above are used in place of 5-fluoro-2-methyl-3-indenyl-β-ethanol, there is obtained the corresponding 1-(4'-methylsulfinylcinnamylidenyl) - 3 - indenyl-β-ethanol compound.

Similarly, when an equivalent amount of the aldehyde of Table I below is used in place of 4-methyl-sulfinylcinnamaldehyde in the above procedure, the corresponding 1-substituted-2-methyl-5-fluoro-3-indenyl - β - ethanol is obtained.

TABLE I

α-tolualdehyde
cinnamaldehyde
hydrocinnamaldehyde
2-methoxycinnamaldehyde
4-methoxycinnamaldehyde
4-ethoxycinnamaldehyde
3,4-dimethoxycinnamaldehyde
4-methylcinnamaldehyde
4-t-butylcinnamaldehyde
2-nitrocinnamaldehyde
3-nitrocinnamaldehyde
4-nitrocinnamaldehyde
4-dimethylaminocinnamaldehyde
4-diethylaminocinnanamaldehyde
2-chlorocinnamaldehyde
4-chlorocinnamaldehyde
2,4-dichlorocinnamaldehyde
4-bromocinnamaldehyde
4-methylthiocinnamaldehyde
2-methylsulfinylcinnamaldehyde
4-methylsulfonylcinnamaldehyde
4-chloro-α-methylcinnamaldehyde
4-chloro-2-nitrocinnamaldehyde
4-chloro-3-nitrocinnamaldehyde
5-chloro-2-methylcinnamaldehyde
4-nitro-α-methylcinnamaldehyde
4-nitro-β-methylcinnamaldehyde
4-nitro-β-phenylcinnamaldehyde
α-methylcinnamaldehyde
α-ethylcinnamaldehyde
β-methylcinnamaldehyde
β-ethylcinnamaldehyde
α-β-dimethylcinnamaldehyde
α-pentylcinnamaldehyde
α-cyclopentylcinnamaldehyde
3,4-methylenedioxycinnamaldehyde
3,4,5-trimethoxycinnamaldehyde
3,4-dimethoxy-α-methylcinnamaldehyde
4-isopropyl-α-methylcinnamaldehyde
4-methoxyhydrocinnamaldehyde
2-methylhydrocinnamaldehyde
4-methylhydrocinnamaldehyde
4-sec butylhydrocinnamaldehyde
4-nitrohydrocinnamaldehyde
4-chlorohydrocinnamaldehyde
4-methylthiohydrocinnamaldehyde
4-methylsulfinylhydrocinnamaldehyde
4-methylsulfonylhydrocinnamaldehyde
4-nitro-α-methylhydrocinnamaldehyde
4-nitro-β-methylhydrocinnamaldehyde
4-chloro-α-methylhydrocinnamaldehyde
4-chloro-β-methylhydrocinnamaldehyde
α-methylhydrocinnamaldehyde
β-methylhydrocinnamaldehyde
α,α-dimethylhydrocinnamaldehyde
4-chloro-α-tolualdehyde
4-methoxy-α-tolualdehyde
4-methylthio-α-tolualdehyde
α-methyl-α-tolualdehyde
α-ethyl-α-tolualdehyde
4-nitro-α-methyl-α-tolualdehyde
4-chloro-α-methyl-α-tolualdehyde
4-phenylbutanal
4-phenyl-2-butenal
2'-thienylacetaldehyde
β-(2'-thienyl)propenal
β-(2'-thienyl)propanal
3'-pyridylacetaldehyde
4'-pyridylacetaldehyde
2'-pyridylacetaldehyde
2'-furylacetaldehyde
5'-chloro-2'-thienylacetaldehyde
α-naphthylacetaldehyde
β-naphthylacetaldehyde
β-(2'-furyl)propenal
β-(2'-pyridyl)propenal
β-(α'-naphthyl)propenal
β-(3'-pyridyl)propenal
β-(4'-pyridyl)propenal
β-(2'-furyl)propanal
β-(2'-pyridyl)propanal
β-(α'-naphthyl)propanal
β-(2'-quinolyl)propanal
β-(2'-pyrrolidinyl)propanal
β-(2'-benzofuranyl)propanal
β-(2'-quinolyl)propenal
β-(2'-pyrrolyidinyl)propenal
β-(2'-naphthyl)propenal
β,β-diphenylpropenal
2'-indanacetaldehyde
β-(2'-benzothiazole)propenal
β-(3'-nitro-2'-thienyl)propenal
β-(1'-methyl-2'-pyrrolyl)propenal
β-(1'-methyl-2'-pyridyl)propenal

EXAMPLE 3

*cis*-5-Fluoro-3-(2-methoxyethyl)-2-methyl-1-(p-methylsulfinylcinnamylidenyl)-indene To *cis*-5-fluoro-2-methyl-1-(p-methylsulfinylcinnamylidenyl)-3-indenyl-β-ethanol from Example 2(B) (0.0017 mole) in dimethoxyethane (10 ml.) is added oil-free sodium hydride (0.048 g., 0.002 mole) and the mixture is stirred at 25° for 1 hour. To the mixture is added methyl iodide (2.28 g., 0.016 mole) and stirring at 25° is continued for 18 hours. The mixture is poured into methylene chloride-water, extracted with methylene chloride, the methylene chloride extract washed with water, dried (MgSO$_4$), and concentrated. The concentrate is chromatographed over silica gel and the eluate concentrated to yield *cis*-5-fluoro-3-(2-methoxyethyl)-2-methyl-1-(p - methylsulfinylcinnamylidenyl)-indene.

Similarly, when an equivalent amount of any one of the other 1-(p-methylsulfinylcinnamylidenyl)-3-indenyl-β-ethanol compounds obtained from Example 2(B) are used in place of 5-fluoro-2-methyl-1-(4'-methylsulfinylcinnamylidenyl)-3-indenyl ethanol in the above example, there is obtained the corresponding 3-(methoxyethyl) compound.

Similarly, when an equivalent amount of any one of the 1-substituted-2-methyl-5-fluoro-3-indenyl-β - ethanol compounds obtained from Example 2(B) are used in place of the indenyl-β-alcohol above, there is obtained the correspondingly 1-substituted-3-(methoxyethyl) compound.

Similarly, when an equivalent amount of ethyl iodide, benzyl iodide or acetylchloride is used in place of methyl iodide in the above example, there is obtained the corresponding ethoxyethyl, benzyloxyethyl, acetoxyethyl compound.

EXAMPLE 4

(A) Methyl 5-fluoro-2-methyl-3-indenylformate

A mixture of 6-fluoro-2-methyl-1-indanone (49.2 g., 0.30 mole), "activated" zinc dust (25.4 g., 0.40 mole), ethyl chloroformate (32.6 g., 0.3 mole) and a crystal of iodine in dry benzene (1.5 liters) is refluxed for 5 hours. The mixture is poured into sulfuric acid (5%, 1.5 liters) and extracted with ether, the ether extract dried (MgSO$_4$) and the ethereal solution concentrated. The crude ester is redissolved in benzene (440 ml.), phosphorus pentoxide (88 g.) added and the resulting mixture refluxed for 30 minutes. The mixture is decanted, the residue washed with benzene, the benzene layers are combined, washed with water, saturated salt solution and dried (MgSO$_4$). The benzene solution is concentrated *in vacuo* and the residue recrystallized from ethyl acetate-n-hexane to obtain methyl 5-fluoro-2-methyl-indenylformate.

Similarly, when an equivalent amount of 5,6-difluoro-2-methyl-1-indanone,
6-cyano-2-methyl-1-indanone,
6-dimethylamino-2-methyl-1-indanone,
6-allyloxy-2-methyl-1-indanone,
5-fluoro-6-methoxy-2-methyl-1-indanone,
6-methoxy-2-methyl-1-indanone,
4-fluoro-2-methyl-1-indanone, or
6-trifluoromethyl-1-indanone is used in place of 6-fluoro-2-methyl-1-indanone in the above example, there is obtained the corresponding methyl-3-indenylformate.

(B) 5-Fluoro-3-hydroxymethyl-2-methylindene

Methyl 5-fluoro-2-methylindenylformate (41.2 g., 0.2 mole) by the method of Example 2(A) is covered to the subject compound.

Similarly, the other methyl-3-indenylformate compounds are converted to their 3-hydroxymethyl compounds.

(C) cis- and trans-5-Fluoro-3-hydroxymethyl-2-methyl-1-(p-methylsulfinylcinnamylidenyl)-indene 5-Fluoro-3-hydroxymethyl-2-methylindene (0.1 mole) by the method of Example 2(B) is converted to the subject compound.

Similarly, the other 3-hydroxymethyl compounds from 4(B) above are converted to their 1-(p-methylsulfinylcinnamylidenyl) compounds.

Similarly, when an equivalent amount of the aldehydes as described in Example 2 are used in place of p-methylsulfinylcinnamaldehyde in Example 4(C) above, there are obtained the corresponding 1-substituted-3-indenyl methanol compounds.

(D) cis-5-Fluoro-3-methoxymethyl-2-methyl-1-(p-methylsulfinylcinnamylidenyl)-indene cis-5-Fluoro-3-hydroxymethyl-2-methyl-1-(p - methylsulfinylcinnamylidenyl)-indene (0.01 mole) by the method of Example 3 is converted to the subject compound.

Similarly, the other 1-(p-methylsulfinylcinnamylidenyl) compounds from Example 4(C) above are converted to their methoxymethyl derivatives.

EXAMPLE 5 cis- and trans-5-Fluoro-2-methyl-1-(p-methylthiocinnamylidenyl)-3-indenyl ethanol To a solution of 5-fluoro-2-methyl-3-indenyl ethanol (0.020 mole) in methanol (60 ml.) is added sodium methoxide (2.16 g., 0.04 mole) and after solution p-methylthiocinnamaldehyde (0.02 mole). The mixture is heated at reflux for 5 hours, cooled, poured into ether-water, extracted with ether, dried (MgSO$_4$) and concentrated to an oil *in vacuo*. The oil is taken up in methylene chloride and chromatographed on silica gel and eluted with ethyl acetate. The fractions of eluate are concentrated to yield cis- and trans-5-fluoro-2-methyl-1-(p-methylthiocinnamylidenyl)-3-indenyl ethanol.

EXAMPLE 6

(A) 5-Fluoro-2-methyl-3-(2'-methoxyethyl)-indene

To 5-fluoro-2-methyl-3-indenyl ethanol from Example 2(A) (0.0017 mole) in dimethoxyethane (10 ml.) is added oil-free sodium hydride (0.048 g., 0.002 mole) and the mixture is stirred at 25° for 1 hour. To the mixture is added methyl iodide (2.28 g., 0.016 mole) and stirring at 25° is continued for 18 hours. The mixture is poured into methylene chloride-water, extracted with methylene chloride, the methylene chloride extract washed with water, dried (MgSO$_4$) and concentrated. The concentrate is chromatographed over silica gel and the eluate concentrated to yield 5-fluoro-2-methyl-3-(2'-methoxyethyl)-indene.

(B) cis-5-Fluoro-3-(2'-methoxyethyl)-1-(p-methylthiocinnamylidenyl)-indene

A solution of Example 6 is condensed with p-methylthiocinnamaldehyde using the procedure of Example 5 to yield the subject compound.

EXAMPLE 7

(A) (3-Chloro-4-methylthio)-phenylpropargaldehyde

A mixture of 3-chloro-4-methylthiocinnamaldehyde (2.0 mole) and acetic acid (1.5 liter) is stirred vigorously while bromine (320 g., 2.0 mole) is added dropwise at 25°. Powdered anhydrous potassium carbonate is added at 25°. When the evolution of gas stops the mixture is refluxed for 30 minutes, cooled and poured into cold water (2.5 liter). The mixture is cooled to 0–5° with stirring and stirred at this temperature overnight. The precipitate is separated by filtration without drying and crystallized from ethanol-water. 3-Chloro-4-methylthio-α-bromocinnamaldehyde is filtered, washed and dried in air.

The aldehyde (1.6 mole), methyl orthoformate (244 g., 2.3 mole), absolute ethanol (320 ml.) and ammonium chloride (4.0 g.) are refluxed for 30 minutes, low boiling components distilled at atmospheric pressure and distilled *in vacuo* to yield 1,1-dimethoxy-3-(3'-chloro-4'-methylthiophenyl)-2-propene. To this compound (1.35 mole) is added potassium hydroxide (132 g., 2.0 moles) in methanol (1400 ml.). The mixture is refluxed for 3 hours and poured into water (11.3 liter). The mixture is extracted with chloroform (3 × 1.5 liter), the combined chloroform extracts washed with water (3 × 660 ml.) and dried (Na$_2$SO$_4$). The chloroform is distilled and the residue fractionated *in vacuo* to obtain 1,1-dimethoxy-(3'-chloro-4'-methylthiophenyl)-2-propane. This compound (1.0 mole) is added to water (1 liter) containing concentrated sulfuric acid (70 ml.) and the mixture is heated on the steam bath for 30 minutes with occasional mixing. The mixture is extracted with ether (3 × 750 ml.), the ether extract washed with water and saturated salt solution, dried (Na$_2$SO) and concentrated to an oil at atmospheric pressure. The oil is distilled *in vacuo* to yield (3-chloro-4-methylthio)-phenyl propargaldehyde.

(B) cis- and trans - 5 - Fluoro-2-methyl-1-(3'-chloro-4'-methylthiophenylpropargylidene)-3-indenyl-β-ethanol (3-Chloro-4-methylthio)-phenylpropargaldehyde (0.2 mole) and ethyl 5-fluoro-2-methyl-3-indenyl-β-ethanol (0.2 mole) are condensed by the method of Example 2(B) to yield the subject compounds.

Using the same reaction conditions and techniques, the following compounds are obtained:

| Starting material | Product |
|---|---|
| Ethyl 5,6-difluoro-2-methyl-3-indenyl-β-ethanol. | cis- and trans-5,6-difluoro-2-methyl-1-(3'-chloro-4'-methylthiophenyl-propargylidene)-3-indenyl ethanol. |
| Ethyl 5-methoxy-6-fluoro-2-methyl-3-indenyl-β-ethanol. | cis- and trans-5-methoxy-6-fluoro-2-methyl-1-(3'-chloro-4'-methylthiophenylpropargylidene)-3-indenyl ethanol. |
| Ethyl 5-dimethylamino-2-methyl-3-indenyl-β-ethanol. | cis- and trans-5-dimethylamino-2-methyl-1-(3'-chloro-4'-methylthiophenylpropargylidene)-3-indenyl ethanol. |
| Ethyl 5-allyloxy-2-methyl-3-indenyl-β-ethanol. | cis- and trans-5-allyloxy-2-methyl-1-(3'-chloro-4'-methylthiophenyl-propargylidene)-3-indenyl ethanol. |
| Ethyl 5-cyano-2-methyl-3-indenyl-β-ethanol. | cis- and trans-5-cyano-2-methyl-1-(3'-chloro-4'-methylthiophenyl-propargylindene)-3-indenyl ethanol. |
| Ethyl 6-fluoro-2-methyl-3-indenyl-β-ethanol. | cis- and trans-6-fluoro-2-methyl-1-(3'-chloro-4'-methylthiophenyl-propargylidene)-3-indenyl ethanol. |

Similarly, when an equivalent amount of any of the other ethanol compounds obtained from Example 2(A) are used in place of 5-fluoro-2-methyl-3-indenyl-β-alcohol in the above Example 7(B), there is obtained the corresponding 1 - (3'-chloro-4'-methylthiophenylpropargylidene)-3-indenyl-β-ethanol compound.

Similarly, when an equivalent amount of any one of the 3-(hydroxymethyl) compounds obtained from Example 4(B) are used in place of 5-fluoro-2-methyl-3-indenyl-β-ethanol in Example 7(B) above, there is obtained the corresponding 1-(3'-chloro-4'-methylthiopropargylidene)-3-indenyl methanol compound.

EXAMPLE 8

(A) t-Butyl 5-fluoro-2-methyl-3-indenyl-α-propionate

Ethyl 5-fluoro-2-methyl-3-indenyl-α-propionate (246.3 g., 1.0 mole), t-butyl acetate (700 g., 6.0 mole) and sodium methoxide (108 g., 2 mole) under nitrogen are stirred and refluxed at 10:1 ratio through a 1.5'-column packed with glass ⅛" helices. The mixture is distilled for 18 hours and 250 ml. of distillate is collected. The excess of t-butylacetate is distilled in vacuo and the residue is taken up in methylene chloride, filtered through diatomaceous earth then through acid-washed alumina. The methylene chloride is removed and the residue crystallized from acetone-n-hexane to yield t-butyl 5-fluoro-2-methyl-3-indenyl-α-propionate.

(B) t-Butyl 5-fluoro-1-hydroxymethylene-2-methyl-3-indenyl-α-propionate, sodium salt To a mixture of t-butyl 5-fluoro-2-methyl-3-indenyl-α-propionate (55.3 g., 0.2 mole) in benzene (500 ml.) and ethyl formate (74.1 g., 1.0 mole) is added oil-free sodium hydride (7.2 g., 0.3 mole). The mixture is stirred at room temperature 1 hour each day for 2 days. Any remaining sodium hydride is decomposed by the addition of methanol (20 ml.) in ether (100 ml.). The salt is filtered, washed with ether and dried in vacuo.

(C) cis- and trans-5-Fluoro-2-methyl-1-(p-methylthiophenoxymethylidene)-3-t-butyl-indenyl-α-propionate The sodium salt (32.6 g., 0.01 mole) from Example 8(B) in dimethoxyethane (200 ml.) is heated at reflux with stirring for 15 hours with p-methylthiophenyl iodode (25.0 g., 0.01 mole). The mixture is concentrated in vacuo to remove solvent, taken up in methylene chloride-water, the layers separated and the water layer extracted with methylene chloride (2× 100 ml.). The combined methylene chloride layers are concentrated to ⅓ volume and chromatographed over silica gel and eluted by methanolic chloroform to separate cis- and trans-isomers.

(D) 5-Fluoro-2-methyl-1-(p-methylthiophenoxymethylidene)-3-indenyl-α-propanol

The product of Step (C) above is reacted in accordance with Example 2(A) to yield the subject product.

Similarly, when an equivalent amount of p-methylsulfinylphenyliodide is used in place of p-methylthiophenyl-iodide in Example 8(C) above and the product reacted by the method of 8(D) above, there is obtained the corresponding 1 - (p - methylsulfinylphenoxymethylidene) compound.

Similarly, when an equivalent amount of any one of the ethyl acetate compounds obtained from Example 1 is used in place of t-butyl-5-fluoro-2-methyl - 3 - indenyl-α-propionate in Example 8(B) above and the resulting product used in Example 8(C) followed by 8(D), there is obtained the corresponding 1 - (p - methylthiophenoxymethylidene)-3-indenyl-β-ethanol compound.

EXAMPLE 9

5-Fluoro-3-(2'-methylethyl)-2-methyl-1-(p-methylthiophenoxymethylidene)-3-indene The method of Example 3 is carried out using an equivalent amount of 5-fluoro-2-methyl-1-(p - methylthiophenoxymethylidene)-3-indenyl-β-ethanol in place of 5-fluoro-2-methyl-1-(p-methylsulfinylcinnamylidenyl)-3 - indenyl-β-ethanol, the subject compound is obtained.

EXAMPLE 10

(A) 5-Fluoro-3-(2-methoxyethyl)-2-methyl indene

The procedure of Example 3 is carried out using an equivalent amount of 5-fluoro-2-methyl - 3 - indenyl - β-ethanol in place of 5-fluoro-2-methyl-1-(p-methylsulfinyl-cinnamylidenyl)-indenyl-β-ethanol to obtain the subject compound.

(B) 5-Fluoro-3-(2-methoxyethyl)-2-methyl-1-(p-methylsulfinylcinnamylidenyl)-indene The product of Example 10(A) above is used in place of (in an equivalent amount) 5-fluoro-2-methyl-3-indenyl-β-ethanol in Example 2(B), and said procedure carried out to yield the subject compound.

EXAMPLE 11

A mixture of 260 parts of 5-fluoro-2-methyl-1-(p-methylsulfinylcinnamylidenyl)-3-indenyl-β-ethanol and 25 parts of lactose is granulated with suitable water and to this is added 100 parts of maize starch. The mass is passed through a 16 mesh screen. The granules are dried at a temperature below 60° C. The dry granules are passed through a 16 mesh screen and mixed with 3.8 parts of magnesium stearate. They are then compressed into tablets suitable for oral administration.

Similarly, when 250 parts of cis-5-fluoro-3-(2-methoxyethyl)-2-methyl-1-(p-methyl-sulfinylcinnamylidenyl)-indene,
cis- and trans-5-fluoro-2-methyl-1-(3'-chloro-4'-methyl-thiophenylpropargylidene)-3-indenyl-β-ethanol,
5-fluoro-2-methyl-1-(p-methylthiophenoxymethylidene)-3-indenyl-α-propanol,
5-fluoro-3-(2'-methoxyethyl)-2-methyl-1-(p-methylthio-phenoxymethylidene)-3-indene,
5-fluoro-2-methyl-1-(p-methylsulfinylphenoxymethylidene)-3-indenyl-α-propanol, or
5-fluoro-2-methyl-1-(p-methylsulfinylphenoxymethylidene)-3-indenyl-β-ethanol is used in place of 5-fluoro-2-methyl-1-methylsulfinylcinnamylidenyl-3-indenyl - β - ethanol in the above example, tablets suitable for oral administration are obtained.

What is claimed is:
1. A compound of the formula:

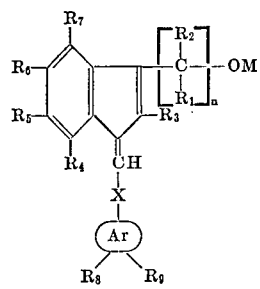

wherein:
- $R_1$ and $R_2$ are hydrogen, $C_{1-5}$ loweralkyl, $C_{2-5}$ loweralkenyl, phenyl or benzyl;
- $R_3$ is hydrogen, $C_{1-5}$ loweralkyl or $C_{1-5}$ chloro, bromo or fluoro loweralkyl;
- $R_4$, $R_5$, $R_6$ and $R_7$ may be hydrogen, halo $C_{1-5}$, loweralkyl, halo $C_{1-5}$ loweralkyl, $C_{1-5}$ loweralkoxy, or trifluoromethyl;
- $R_8$ and $R_9$ are each hydrogen, chloro, bromo, fluoro, $C_{1-5}$ loweralkylthio, $C_{1-5}$ loweralkyl, trifluoromethyl, $C_{1-5}$ loweralkylsulfonyl, $C_{1-5}$ loweralkylsulfinyl, nitro or $C_{1-5}$ loweralkoxy; with the proviso that one of $R_8$ or $R_9$ be $C_{1-5}$ lower alkyl sulfonyl or $C_{1-5}$ lower alkyl sulfinyl;
- X is a $C_{2-4}$ alkylene, $C_{1-4}$ alkenylene, $C_{2-4}$ alkynylene or —O—;
- $n$ is 1 or 2;
- (Ar) is phenyl; and
- M is hydrogen, $C_{1-5}$ loweralkyl, phenyl or benzyl.

2. The compound of claim 1 wherein $R_1$ and $R_2$ is hydrogen, $C_{1-5}$ loweralkyl, phenyl or benzyl; $R_3$ is hydrogen or $C_{1-5}$ loweralkyl; $R_4$, $R_5$, $R_6$ and $R_7$ are each hydrogen, chloro, bromo, fluoro, $C_{1-5}$ loweralkyl, $C_{1-5}$ loweralkoxy, nitro, amino, halo $C_{1-5}$ loweralkyl, $C_{2-5}$ loweralkanoyloxy, hydroxy or trifluoromethyl, at most only 2 of $R_4$, $R_5$, $R_6$ or $R_7$ being other than hydrogen at any one time; $R_8$ and $R_9$ are each hydrogen, $C_{1-5}$ loweralkyl, $C_{1-5}$ loweralkoxy, $C_{1-5}$ loweralkylsulfinyl, $C_{1-5}$ loweralkylsulfonyl, chloro, bromo, fluoro, $C_{1-5}$ loweralkylthio, trifluoromethyl, $C_{1-5}$ diloweralkylsulfamyl or nitro; X is $C_{1-4}$ alkylene, $C_{2-4}$ alkenylene, $C_{2-4}$ alkynylene or —O—; $n$ is 1 or 2; and M is hydrogen, $C_{1-5}$ loweralkyl, benzyl or phenyl.

3. The compound of claim 2 wherein X is $C_{1-2}$ alkylene, $C_{2-3}$ alkenylene, $C_{2-4}$ alkynylene or —O—.

4. The compound of claim 2 wherein:
- $R_1$ is hydrogen;
- $R_2$ and $R_3$ are each hydrogen or loweralkyl;
- $R_4$ to $R_7$ are each hydrogen, chloro, bromo, fluoro, $C_{1-5}$ loweralkyl, $C_{1-5}$ loweralkoxy or $C_{2-5}$ loweralkenyloxy;
- $R_8$ and $R_9$ are each hydrogen, chloro, bromo, fluoro $C_{1-5}$ loweralkoxy, $C_{1-5}$ loweralkylsulfinyl, $C_{1-5}$ loweralkylthio or $C_{1-5}$ loweralkylsulfonyl;
- M is hydrogen or $C_{1-5}$ loweralkyl;
- $n$ is 2; and
- X is $C_{1-2}$ alkylene, $C_{2-4}$ alkynylene or —O—.

5. The compound of claim 4 wherein:
- $R_2$ is hydrogen;
- $R_3$ is methyl;
- $R_4$, $R_5$, $R_7$ and $R_8$ are each hydrogen;
- $R_6$ is fluoro;
- $R_9$ is methylsulfinyl, or methylsulfonyl or methylthio; and
- M is hydrogen.

6. The compound of claim 5 wherein $R_9$ is methylsulfinyl.

References Cited
UNITED STATES PATENTS
3,732,292   5/1973   Hinkley et al. _____ 260—607 A
3,642,785   2/1972   Shen et al. _____ 260—618 F LEWIS GOTTS, Primary Examiner D. R. PHILLIPS, Assistant Examiner U.S. Cl. X.R.

260—618 F, 465 R, 466 L, 609 F, 611 A, 558 S, 558 A, 596 R, 508; 424—337, 339, 343

PO-1050
(5/69)

UNITED STATES PATENT OFFICE
CERTIFICATE OF CORRECTION

Patent No. 3,819,716      Dated June 25, 1974

Inventor(s) Tsung-Ying Shen, Howard Jones

It is certified that error appears in the above-identified patent and that said Letters Patent are hereby corrected as shown below:

In Claim 1, line 29, "$C_{2-4}$ alkylene" should read "$C_{1-4}$ alkylene".

Signed and sealed this 29th day of October 1974.

(SEAL)
Attest:

McCOY M. GIBSON JR.
Attesting Officer

C. MARSHALL DANN
Commissioner of Patents